US007996829B2

(12) United States Patent
Depew et al.

(10) Patent No.: US 7,996,829 B2
(45) Date of Patent: Aug. 9, 2011

(54) MANAGING SOFTWARE REVISIONS FOR SERVERS IN AN INFRASTRUCTURE (75) Inventors: Kevin G. Depew, Spring, TX (US); Scott P. Faasse, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1409 days.

(21) Appl. No.: 11/497,487

(22) Filed: Jul. 31, 2006

(65) Prior Publication Data
US 2008/0028368 A1    Jan. 31, 2008

(51) Int. Cl.
G06F 9/44     (2006.01)
G06F 9/445    (2006.01)

(52) U.S. Cl. ........ 717/170; 717/168; 717/169; 717/171; 717/174; 717/175; 717/176

(58) Field of Classification Search ........... 717/168–170
See application file for complete search history.

(56) References Cited

U.S. PATENT DOCUMENTS 7,539,744 B2 *  5/2009 Matthews et al. ............. 709/223
7,702,777 B2 *  4/2010 Cromer et al. ................ 709/224
2004/0243798 A1 * 12/2004 Goud et al. ................... 713/100
2004/0255286 A1 * 12/2004 Rothman et al. .............. 717/168
2004/0260936 A1 * 12/2004 Hiray et al. ................... 713/200
2006/0015861 A1 *  1/2006 Takata et al. .................. 717/168
2007/0169088 A1 *  7/2007 Lambert et al. ............... 717/168
2008/0141236 A1 *  6/2008 Buckler et al. ................ 717/168

OTHER PUBLICATIONS

Rasmussen, "Strategies for Deploying Blade Servers in Existing Data Centers," APC, lamdahellix.com, 2006.*

* cited by examiner

Primary Examiner — Insun Kang (57) ABSTRACT

A method and system manages revisions of software code for one or more servers in an infrastructure. An indication of the version of the code currently residing with one of the servers is transmitted to the infrastructure. An indication of the version of the code currently residing with the infrastructure for the server's type is also transmitted to the one of the servers. A determination is made as to whether the server's version should be updated to the infrastructure's, whether the infrastructure's version should be updated to the server's, or neither based on the transmitted indications in view of a set of preconfigured update rules. If the infrastructure's version should be updated to the server's, the image of the code currently residing with the infrastructure is replaced with an image of the code currently residing with the server. If the server's version should be updated to the infrastructure's, the image of the code currently residing with the server is replaced with an image of the code currently residing with the infrastructure for the server's type.

17 Claims, 6 Drawing Sheets

MANAGING SOFTWARE REVISIONS FOR SERVERS IN AN INFRASTRUCTURE

BACKGROUND

As computing needs have increased, the need for more efficient use of space in data centers has driven the development of denser computing solutions. In addition, the need for easier setup, management, and maintenance has influenced new server designs. Both of these datacenter needs have driven the development of a new class of server systems known as blades. Blades have been made feasible by technology advances allowing complex computer systems performing server functions to be designed in a very dense package. Several of these blade servers may then be inserted into an enclosure infrastructure through which the blade servers are able to share common power supply and ground busses, as well as communications busses over a backplane. This enclosure is housed within a standard server rack. A blade infrastructure allows for increased server density and simplifies the cabling and management of the blade servers as compared to standard rack-mount servers. Many applications that are computationally intensive or that manage large databases or mass storage arrays are addressed using a significant number of servers in parallel. Blades are useful for such applications. One of the challenges of managing a large number of servers, whether blade-based as described above or rack-based servers coupled together over a network such as a local area network (LAN), is maintaining software/firmware code revisions within those servers as each individual system is hardware and/or firmware updated.

Those tasked with the management of large groups of servers employ a wide range of different policies for maintaining system code versions/revisions for each server. One such firmware component that must be managed is the system firmware. Some users may wish to always upgrade each blade to the very latest revision of the system firmware. Others may seek to standardize on a particular revision of the system firmware that they believe is the most reliable for their particular application environment, notwithstanding that one or more new versions/revisions may have been released for the blade server type(s) that they are employing. No matter what software upgrade policy a manager prefers to implement, there are always going to be cases where the system firmware or other software code residing with a server must be upgraded. For a particular server type, a newer firmware version/revision may be required to support a new stepping (i.e. a new mask revision) of its processor or chipset. These hardware updates are almost always accompanied by a required update in the firmware code, which is typically backwards compatible with earlier versions of the processor or chipset. In addition, there may be firmware code updates that are required because they address some critical systems operation issue, and should be made to all of the blades of that type in which previous versions/revisions of the firmware lacking those critical updates currently reside.

Typical regimes employed today for managing system firmware and other software versioning for blade servers follows the same methodology commonly employed for stand-alone rack and tower servers. Each blade contains a revision of the firmware/software code. When upgrading the firmware code for a blade, the same techniques are used as those commonly used for flashing stand-alone servers. Each server system has its code image updated independently by flashing the flash ROM component with the new version/revision to overwrite the old version/revision. Standard mechanisms and policies for maintaining and updating firmware revisions are applied, albeit manually, in this process. In this case, the individual blades of a blade infrastructure provide no specific features for maintaining firmware/software code revisions beyond that which are commonly provided for stand-alone servers.

Mechanisms have been developed by server system vendors in an effort to simplify the upgrade of system ROM firmware or other software revisions for users. For example, Online Flash and mechanisms for mass deployment through Systems Insight Manager are provided by Hewlett Packard Company and can be used to simplify the process of upgrading system firmware. Online Flash mechanisms allow the system firmware to be updated while running the operating system, but require the system be rebooted after the flash process. Mass deployment mechanisms can be employed to update a large number of servers. This allows setting up scripts to allow many servers to be upgraded without manually touching each server. Notwithstanding, these mechanisms still require the user to perform a substantially manual process of identifying which servers should be upgraded and configuring the individual servers, including blade servers sharing a common infrastructure, to upgrade their individual versions of the system ROM firmware or other software.

A more recently proposed mechanism for managing system ROM firmware revisions on the individual blades of a blade infrastructure is to store the only copy of the system ROM on the enclosure of the infrastructure. Each individual blade must still contain a ROM part (this could be a one-time programmable or flash part). Typically, this ROM part would still contain code that performs basic initialization of the system, including configuring the memory subsystem to allow the system to copy the System ROM from the enclosure into shadowed memory of each of the blades. A similar proposed implementation requires that the blade actually fetch code directly from the enclosure's flash ROM. The advantage of this technique is that it simplifies the management of system software versions to only one centralized copy of the software for each particular blade type supported by the enclosure.

However, this simplification is not without its disadvantages. By restricting system software such as system ROM firmware to a single centralized copy for a given blade type in the infrastructure, the versioning process is not nearly as flexible as the manual techniques that are largely still deployed in the field. Because all blades within the infrastructure are constrained to only use the single copy of firmware code residing with the enclosure for their type, the updating of firmware on a blade-by-blade basis would not be permitted. Thus, the maintenance of system software updates using this proposed technique is significantly more restrictive than the update rules already commonly used. For example, a user may wish to observe a firmware update running on a limited number of blades before requiring that all blades of that type be updated. Moreover, it would not be possible to employ a blade that has a newer version of hardware (e.g. a new stepping of the processor for that blade type) if a newer version of the system firmware is required to support that newer hardware, at least until the enclosure's version is updated. Finally, implementing this technique would require a significant departure from the architecture (including both hardware and software) of current systems in the field. Thus, systems would have to be redesigned architecturally, including the development of new ASICs to support such a feature, and users would be required to learn new flash upgrade methods that will be more restrictive than they currently have.

BRIEF DESCRIPTION OF THE DRAWINGS

For a detailed description of embodiments of the invention, reference will now be made to the accompanying drawings in which.

DETAILED DESCRIPTION

Notation and Nomenclature

Certain terms are used throughout the following description and in the claims to refer to particular features, apparatus, procedures, processes and actions resulting there from. For example, the terms system software and firmware are used generally to denote software code required for operation of the system in which it is executed and for which the maintenance of updated versions of that software and firmware are critical to proper operation of those systems. The term server is used to denote any computer system for which the maintenance of its system software/firmware is critical to the user of such a system, and is not intended to otherwise restrict the interpretation of that term to any particular type of computer system. Those skilled in the art may refer to an apparatus, procedure, process, result or a feature thereof by different names.

This document does not intend to distinguish between components, procedures or results that differ in name but not function. For example, while certain memory components in embodiments of the invention may be distinguished as RAM, ROM, flash ROM, etc., it will be understood by those of skill in the art that these various types of memory components may be used interchangeably if they are able to provide the necessary functionality as described for the embodiment. The term server is used throughout to describe any computer system for which it may be desirable to operate a plurality thereof within a common infrastructure as described. The terms version and revision are intended to be used throughout interchangeably. No further limitation to the interpretation of claims reciting these terms is intended or implied unless such distinctions are expressly recited in those claims. In the following discussion and in the claims, the terms "including" and "comprising" are used in an open-ended fashion, and thus should be interpreted to mean "including, but not limited to . . . ."

The following discussion is directed to various embodiments of the invention. Although one or more of these embodiments may be preferred, the embodiments disclosed should not be interpreted as, or otherwise be used for limiting the scope of the disclosure, including the claims, unless otherwise expressly specified herein. In addition, one skilled in the art will understand that the following description has broad application, and the discussion of any particular embodiment is meant only to be exemplary of that embodiment, and not intended to limit the scope of the disclosure, including the claims, to that embodiment.

Embodiments of the invention are described herein that simplify the managing and maintaining of system ROM firmware revisions, or the revisions of other important software code, common to servers controlled through a common infrastructure. Embodiments are configurable to automatically update each of the server's current version or revision of its firmware or other software code with an image of a different version or revision of that code residing within memory belonging to the infrastructure. Embodiments are further configured to automatically update the infrastructure's image of the current version or revision of the firmware or other software code for a given server type with an image of a different version or revision of that code residing in the system memory of servers of that type. This can be useful if the server blade is shipped with a version of revision of the code which is newer than that currently stored on the infrastructure. In a further aspect of the invention, these updates are effectuated in view of a set of update rules that are pre-configurable by a user through a user interface such as a graphical user interface (GUI) and which reside in the firmware of the infrastructure. Embodiments disclosed herein are illustrative of both a blade-based system, in which the servers are individual blades that are housed in a common enclosure that is part of the infrastructure. Embodiments are also disclosed for rack-based servers where the infrastructure includes a central computer system that is coupled to the rack-based servers through a network such as a LAN or the Internet.

Figure 1:
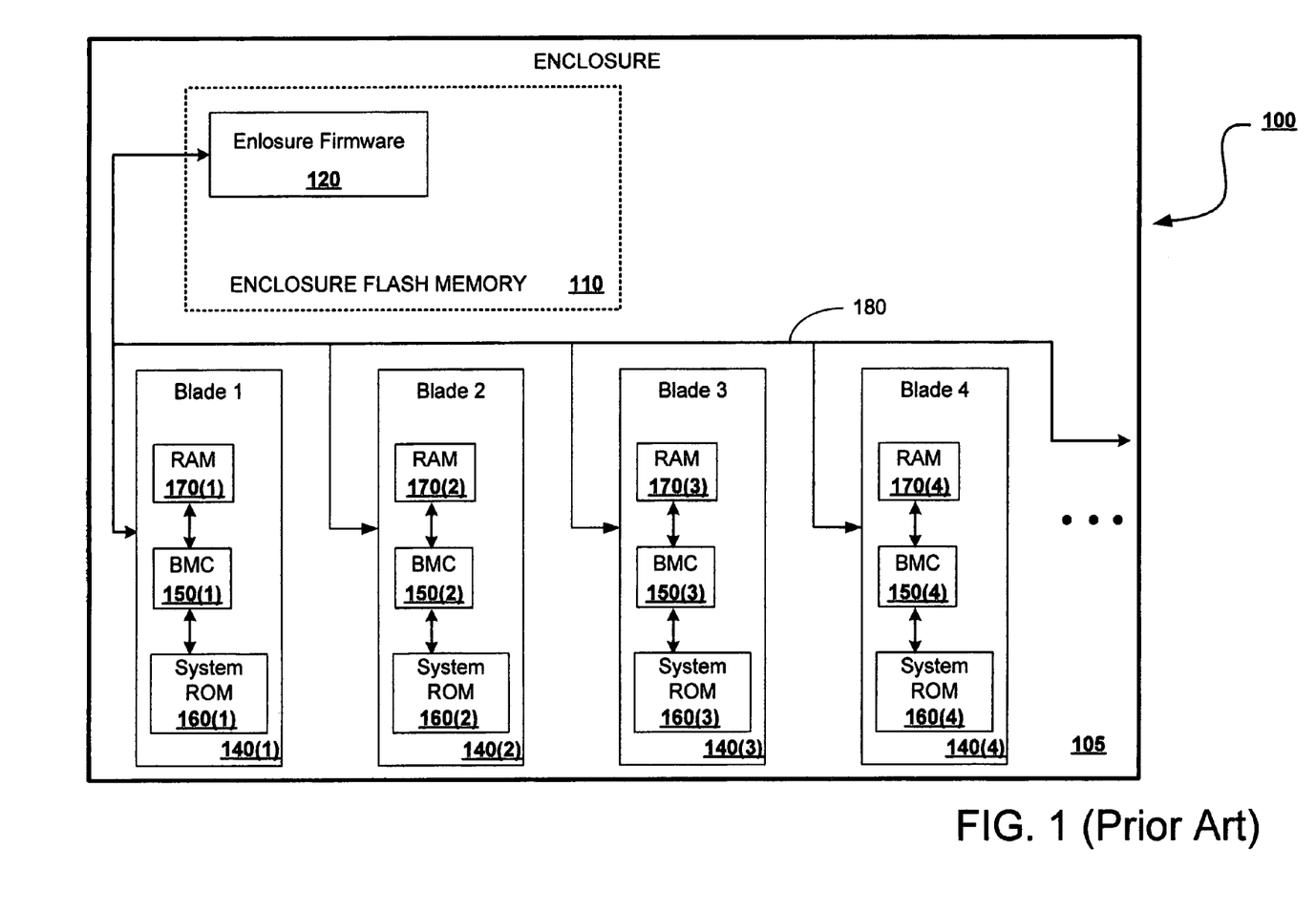
FIG. 1 is a block diagram that illustrates a system configured to support the management of system ROM revisions commonly deployed for stand-alone and blade servers as is known in the art.

FIG. 1 illustrates some components of a blade-based system 100 representative of systems commonly employed in the field. The system includes an infrastructure for communicating with the servers, including an enclosure 105 that houses a plurality of blade servers 140(1)-(4). The enclosure includes firmware code 120 stored on a flash memory 110 that when executed produces the various functions of the enclosure. The infrastructure also typically includes a computer system as a user interface with the enclosure 105, which is not shown. Blades 140(1)-(4) typically include RAM 170(1-4), system ROM 160(1-4) and a base management controller (BMC) 150(1-4) through which each of the blades communicates with the enclosure 105.

To update each particular server's version or revision of that server's firmware code, the user must set up the process for that individual blade. One method of performing this procedure is through a communication process with the enclosure's firmware. This is typically accomplished through a user interface (not shown) coupled to the firmware 120 residing on semi-permanent memory 110 in the enclosure 105. The new version/revision of the firmware code to which the server 140 is to be updated is typically transmitted by the enclosure's firmware 120 to the blade 140 through the blade's BMC 150. The transmitted code can be stored temporarily in the blade's RAM 170 before the blade writes the new version/revision of the code over that which is currently stored on the blade 140. System ROM 160 is typically a form of semi-permanent ROM such as flash ROM as is known to those of skill in the art. Thus, the system ROM 160 can also be flashed directly from the enclosure 105 firmware 120.

Another method of updating the blade server's version of revision of firmware code is to run a program which typically provides a user interface on the blade server itself. This program can write data directly into the ROM or flash ROM of the server with the new revision or version of the code. A reboot of the blade server is typically required for the firmware revision update to be complete. This is the standard practice currently used for updating blade server firmware.

An analogous configuration of the system of FIG. 1 has been proposed for managing revisions for rack-based servers. Because rack-based servers are too large to be housed in the same enclosure, no enclosure is used as with blade-based servers. Thus, the infrastructure can include a computer system to provide a user interface, as well as the firmware and communications interface with the servers. In lieu of the BMCs 150(1-4) are network interface cards (NICs) through which the rack-based servers would be coupled to the system computer over a network. The network could be an Ethernet LAN (local area network) for example, or even the Internet. As with updating revisions of firmware and software on blade servers, the common practice for rack-mount servers is to run a program or update utility on the server itself. This program will write the new revision of the firmware onto the ROM or flash ROM of the server.

As previously discussed, the disadvantage of the foregoing system configurations is that a manager/user must keep track of the version/revisions of the firmware code for all of the individual blades or individual rack-based servers and must implement a chosen update regime manually. As the number of servers/blades, the number of different types of servers/blades and their respective ages increase, this task can become difficult and time-consuming. Those of skill in the art will recognize that various model types of a vendor's servers can be supported together in a single enclosure, even though each system type may differ internally, particularly in its hardware configuration. Moreover, even some systems provided by different vendors may be able to operate successfully within the same enclosure notwithstanding their respective internal differences. While system vendors have provided software for their systems to aid users in facilitating this revision management process, the process remains largely non-automated.

Figure 2:
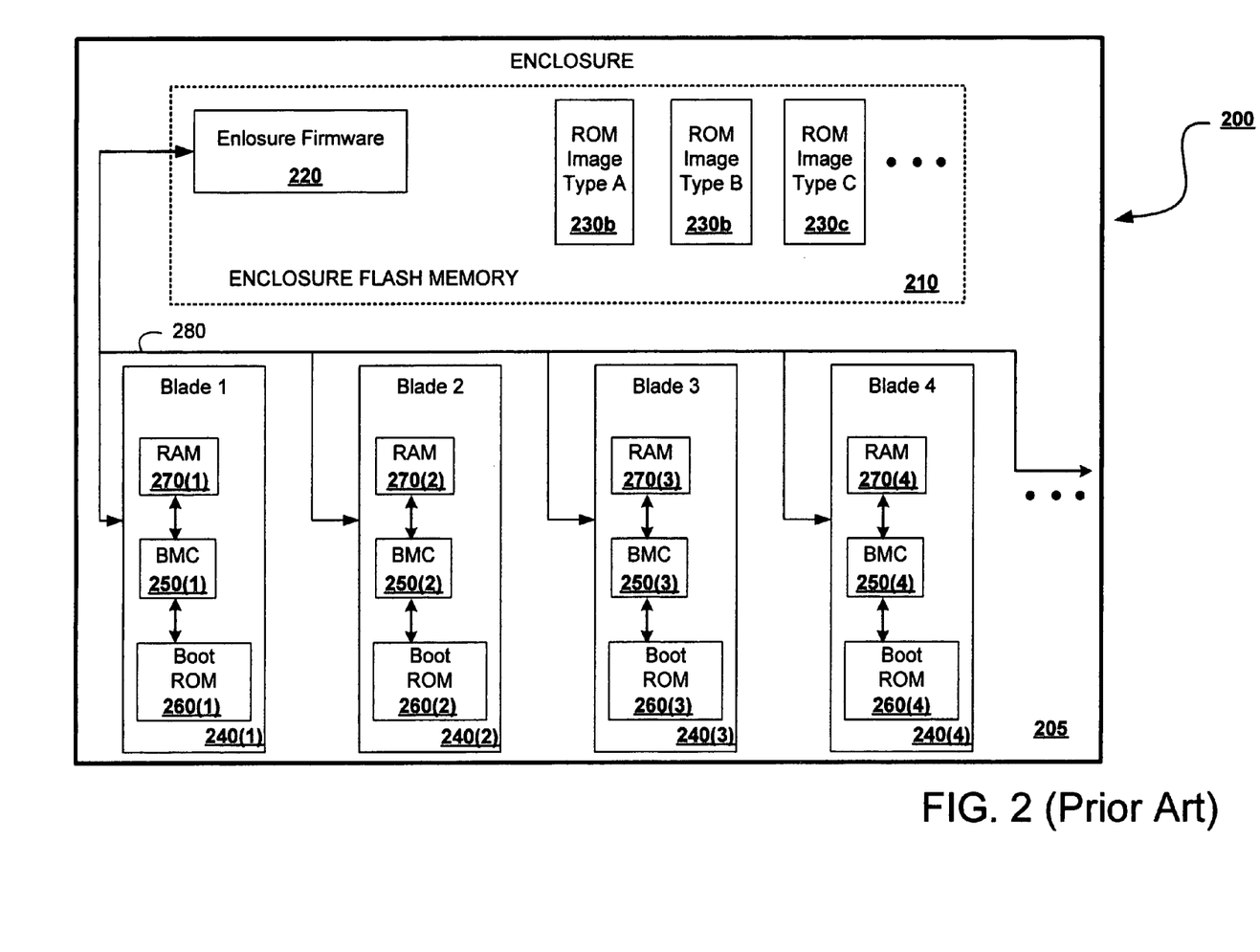
FIG. 2 is a block diagram that illustrates a proposed system configured to support a more automated management of system ROM revisions as is known in the art.

FIG. 2 illustrates a proposed blade-based system configuration 200 intended to make revision management easier for a user/manager. The primary difference between the configurations of FIG. 2 and FIG. 1 is that the enclosure 205 has stored therein images 230a-c of the only permitted version/revision of firmware code for each blade type 240 housed in the enclosure 205. Code images 230a-c are stored on the semi-permanent (e.g. flash memory) of the enclosure 205 and thus the only versions of the system firmware code residing on the system 200 and the only versions of the firmware that must be managed by the user. Anytime a blade server 240 of any type is installed into the infrastructure or is rebooted, it retrieves the firmware code image for its type from the enclosure and uses that for its operation. In this way, each blade-type installed in the infrastructure 205 will always use the same revision and the manager/user does not have to know what versions/revisions of the code are installed on each of the individual servers installed in the infrastructure.

While the foregoing configuration would simplify revision management for the servers installed in the infrastructure, it also greatly restricts the flexibility that users/managers currently enjoy in managing system code revisions. For example, a newly installed blade may require a revision of the firmware code necessary for proper operation of the blade if it has, for example, a new hardware configuration or a new stepping of its processor. If the only version of the firmware is an older revision residing on the infrastructure, this blade will not operate properly until the manager has updated its image of the firmware for that blade type to the one necessary for proper operation of the new blade. It would also be desirable for a system vendor to ship a blade with a more recent revision of the firmware than that currently residing with the infrastructure to resolve critical issues for all blades of that type installed in the infrastructure. It would be further desirable for a user/manager to use that revision to update all of the other blades from that blade's revision. Finally, requiring blades to obtain firmware code from the infrastructure would require a significant re-design of blade architecture from that currently used. For example, implementing the foregoing will require new ASIC development to support the blade server in fetching directly from storage not local to the blade server.

Embodiments of the invention disclosed herein permit automated management of the revision process, permitting the update of code versions of installed blades from the images stored on the infrastructure, as well as updating the images of the code residing with the infrastructure with newer revisions from newly installed blades where appropriate. The user/manager can implement a desired management regime by pre-configuring update rules through a user interface to the firmware of the infrastructure. Embodiments of the invention do not require any significant re-design of the existing system architecture of the servers or the infrastructure, other than the addition of code in the system firmware to handle the communication process between the infrastructure and the servers and to initiate transfers of code based on the pre-configured rules and the current revision status of the code images residing on a blade and the infrastructure.

Through the preconfigured rules, the user is able to configure a policy for when updates (in the form of upgrades/downgrades) occur and when they do not. Through appropriately established policies, the embodiments of the invention are operable to, for example, permit the updating of only the code image stored on the enclosure, and to propagate the revision to all blades of a given type installed within the infrastructure (e.g. enclosure) when they are rebooted. Thus, only the code image on the enclosure has to be updated and the blade servers can be automatically updated rather than necessitating a code image update on each individual blade.

In addition, the invention can be configured to automatically propagate a new code revision residing with a blade inserted into the enclosure to the other blades of that type within the enclosure. Through proper pre-configuration of the revision rules, embodiments of the invention can simplify the management of code revisions for users who wish to implement different policies, whether that is to always utilize the latest revisions of the code or to standardize on a particular revision.

Figure 3:
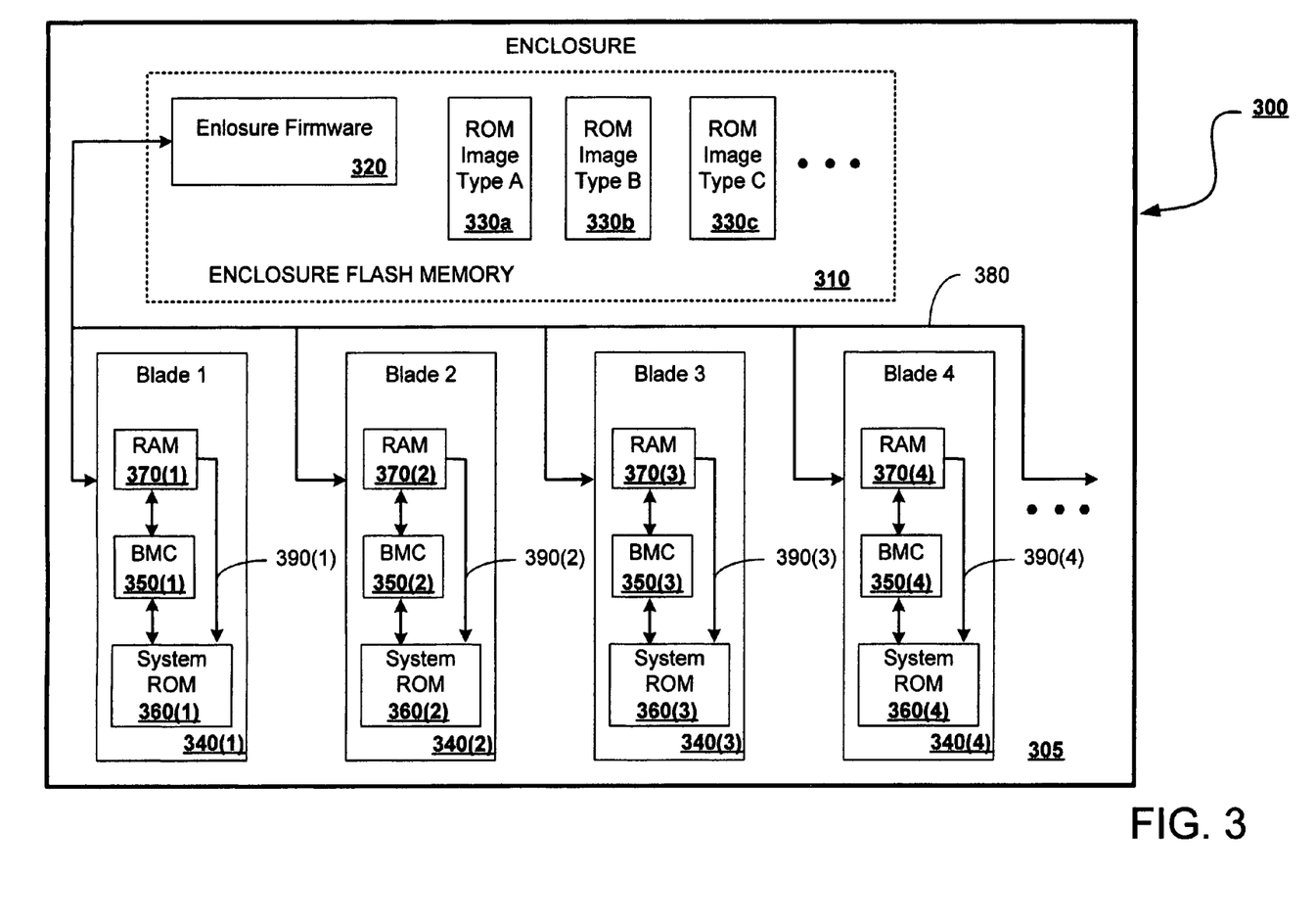
FIG. 3 is a block diagram that illustrates a blade-based system configured to implement a more flexible automated method of managing system ROM firmware revisions or revisions of other system software deployed in the context of blade servers in accordance with an embodiment of the invention.

FIG. 3 illustrates an embodiment of a blade-based system 300 in accordance with the invention. The system 300 employs an infrastructure that includes enclosure 305 and a user interface (not shown for simplicity) that would be coupled to the enclosure 305 for communicating with the enclosure's firmware 320. The user interface can be a standard personal computer (PC) for example, that has a display and an input means such as a keyboard and mouse. The firmware can be stored on a semi-permanent or semi-persistent memory part such as flash ROM 310. Those of skill in the art will appreciate that this memory can be any that provides semi-persistent storage, that is, memory that does not lose its data in the absence of power and for which data is overwritten through a process such as flashing the flash ROM 310.

Enclosure 305 houses a plurality of blade servers 340(1-4) that can be of various types. That is, they can be servers that have different hardware and/or firmware configurations that are able to operate together in the same infrastructure. Thus each blade type may require a different version or revision of software code (e.g. system firmware) that is associated specifically with that blade type to operate properly. Each blade 340(1-4) typically includes a system ROM 360(1-4) that is usually semi-permanent in nature, such as a flash ROM. System ROM 360(1-4) is typically used to store system firmware and other software that when executed is used to support the blade's operation.

Blades 340(1-4) also typically include a controller 350(1-4) through which communication is conducted with the infrastructure firmware 320 residing in this case with the enclosure 305. This controller can be a non-standard one that has been added to the servers 340(1-4), or as illustrated, it can be one that is commonly included in most commercially available blades and that is known to those of skill in the art as the base management controller (BMC). BMC 350(1-4) is a controller that typically is included already in commercially available blades for the purpose of performing simple handshaking functions with the enclosure firmware 320, and thus is convenient to implementing an embodiment of the invention. Finally, each blade can have RAM 370(1-4) to support system operation as well as to support the blade flashing its own system ROM 360(1-4) as will be discussed below.

Enclosure 305 Flash ROM 310 can also be used to store one or more software code images 330a-c (e.g. system firmware) each which is a version/revision of software code for each blade type installed in the enclosure 305. Those of skill in the art will appreciate that any number of blade types may be supported constrained only by the capacity of flash ROM 310. The number of code images 330(a-c) are limited to three for simplicity of illustration only. Those of skill in the art will appreciate that the number of code images supported can be expanded by compressing the code images for storage on the enclosure's flash ROM and then decompressed either before or after the image is transferred to a blade for updating purposes. Moreover, the number of blades 340(1-4) installed in the enclosure can be any number, constrained only by the number of slots available within available enclosures 305. The blades 340(1-4) shown in FIG. 3 are limited to four for simplicity of illustration only.

Figure 4:
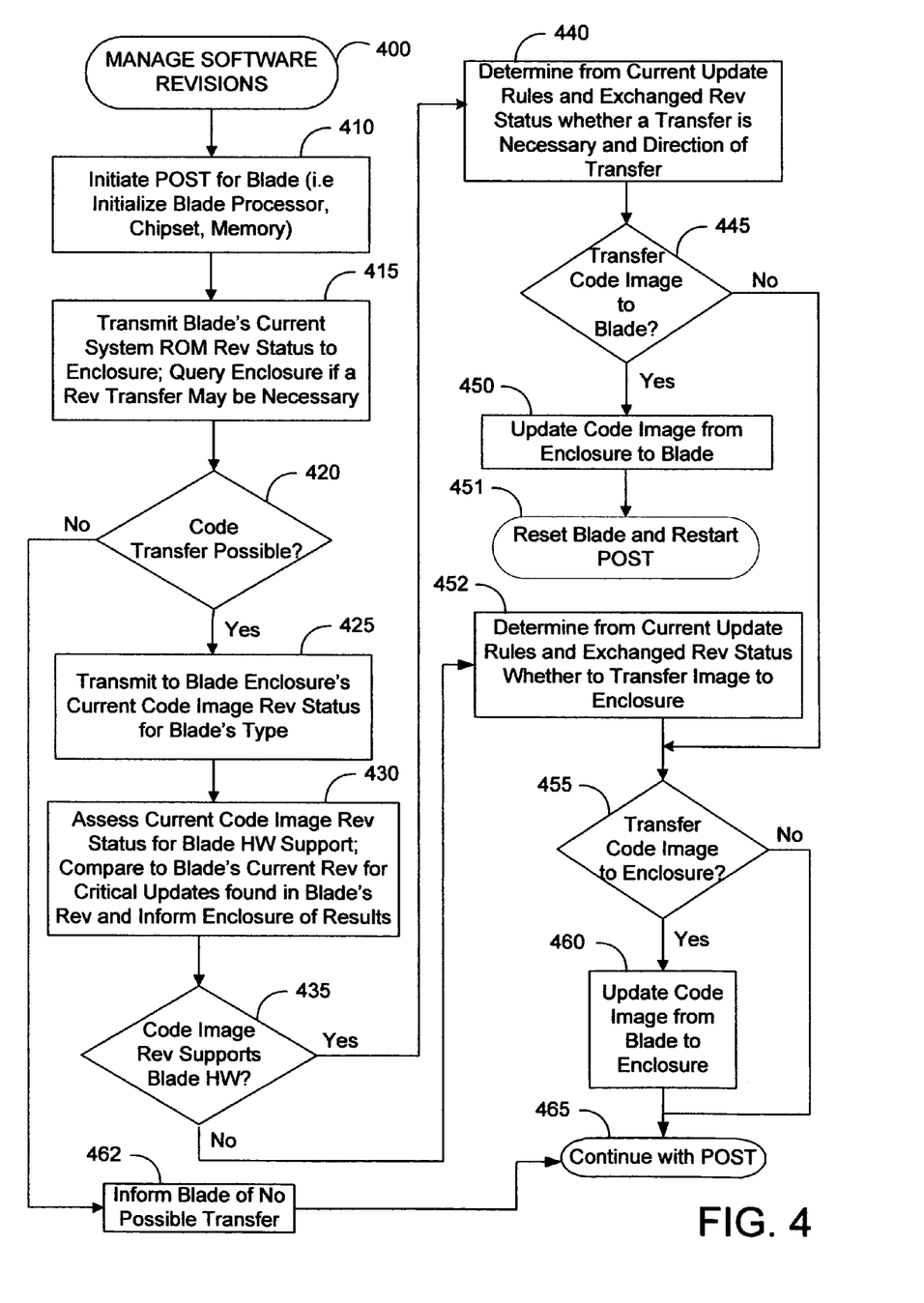
FIG. 4 is a process flow diagram illustrating a method of managing system ROM firmware revisions or revisions of other system software in accordance with an embodiment of the invention.

FIG. 4 is a procedural flow diagram illustrating an embodiment of the handshaking process for managing revisions of software code 400 as implemented by embodiments of the system such as that illustrated in FIG. 3. Those of skill in the art will appreciate that the handshaking functions between the enclosure 305 and the blades 340(1-4) as described in FIG. 4 will be performed through the execution of firmware code that will reside in both the blade system ROM 360(1-4), the BMC 350(1-4), and the enclosure flash memory 310. Those of skill in the art will appreciate that the flow diagram of FIG. 4 is for illustration purposes and is but one way of ordering and describing the functions.

The revision management process 400 begins by launching an initialization of one of the blades 340(1-4) at 410. This process begins by setting up the blade's hardware including the memory subsystem, and is known to those of skill in the art as the Power On Self Test (POST). The POST can be initiated by the blade when it is first installed and begins to boot, or it could be initiated by a user through the user interface (not shown). At 415, the initializing blade 340 transmits an indication of the current version/revision status of its code to be revision managed (e.g. system firmware) to the enclosure's firmware 320 through controller 350, along with a query as to whether a code transfer is possible between the blade 340 and the enclosure 305, FIG. 3. At 420, the enclosure's firmware assesses the blade's transmitted revision status in view of the update policy established by a user in pre-configuring the update rules. If, based on the blade's revision in view of the preconfigured rules a transfer is not possible, the enclosure so informs the blade at 462 and the blade continues its POST process to completion at 465. If a transfer is possible, the enclosure 305, FIG. 3 so notifies the blade and transmits to the blade an indication of the version/revision status of its code image for the blade's type at 425. This step is performed because certain policies that may be established through pre-configuration of the update rules may render it unnecessary to continue the handshaking protocol if there is no potential for a code image transfer.

At 430, it is determined based on the current revision/version status of the enclosure's code image for the blade's type whether it supports the current hardware configuration of the blade, as well as whether the blade's current version/revision contains critical updates not included in the enclosure's version/revision and so informs the enclosure of the result. If at 435, the enclosure's version/revision does not support the blade's current hardware configuration, the blade proceeds to 452 where a decision is made whether to transfer the blade's code image to the enclosure. The blade will not allow its code image to be replaced by that of the enclosure and thus bypasses 440. This prevents the blade from accepting an update to a code revision that cannot properly support the blade's hardware configuration. If the enclosure's version/revision does support the blade's hardware, processing proceeds at 440 where it is determined, based on the exchanged version/revision status in view of the preconfigured update rules whether an update is necessary and in which direction that update should flow. A more detailed discussion of the preconfigured update rules will be presented later.

If based on the assessment at 440, the blade's version of the code is to be updated with the enclosure's version/revision, processing is transferred at 445 to 450 and the enclosure's code image is transferred by the enclosure's firmware to the blade over bus 380, FIG. 3. In an embodiment, the blade's system ROM can be overwritten directly, or the image can first be stored in the RAM and then overwritten under control of the blade itself. If based on the assessment at 440, the version/revision of the enclosure's code image is to be updated with the blade's version/revision of the code, the blade's code is transferred to the enclosure's firmware 320 over bus 380. The firmware can then overwrite its image of the code for that blade type with that transferred from the blade.

Figure 5:
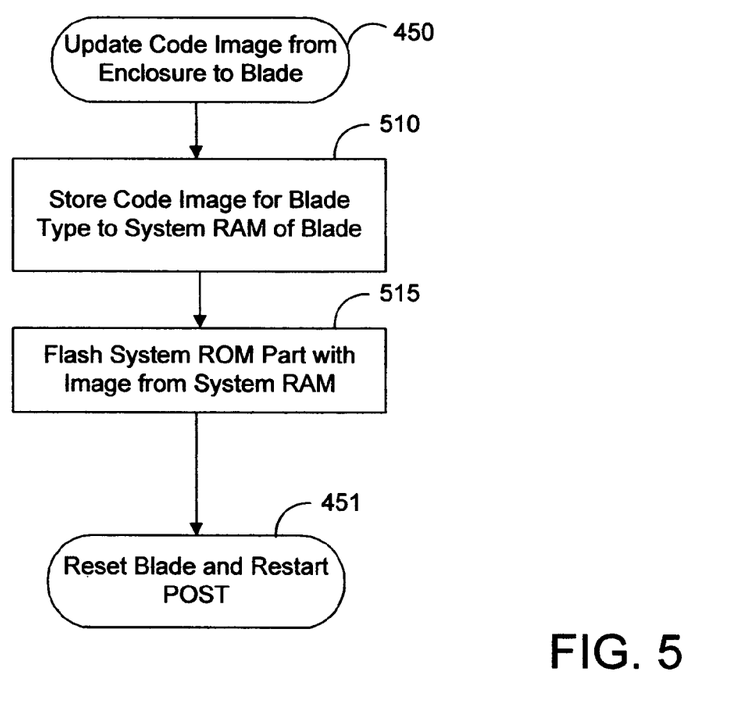
FIG. 5 is a process flow diagram illustrating a sub-process of the flow diagram of FIG. 4 where an initializing blade's system ROM firmware is updated with a version of system ROM firmware an image of which resides with the enclosure in which the blade resides in accordance with an embodiment of the invention.

FIG. 5 illustrates a more detailed procedural flow for the Update Code Image from Enclosure to Blade process at 450. In an embodiment, the code image is transferred from the enclosure flash ROM 310 to the blade 340 over bus 385 and through controller 350. The code image is stored in the RAM 370 of the blade at 510. At 515, the blade flashes its system ROM 360 to overwrite its current version/revision of the code with the code image from its RAM 370. This should not affect the blade's operation as it is typically executing out of shadowed memory. At 451, the blade resets itself and re-launches its POST process back at 410, FIG. 4. This can be achieved through a variety of methods. For example, the blade's firmware could make a jump to a reset vector. The user could initiate it manually through a keyboard controller reset. Another option would be to take advantage of proprietary methods, such as generating a PWRGOOD transition, which is provided by Hewlett Packard on its server platforms.

Figure 6:
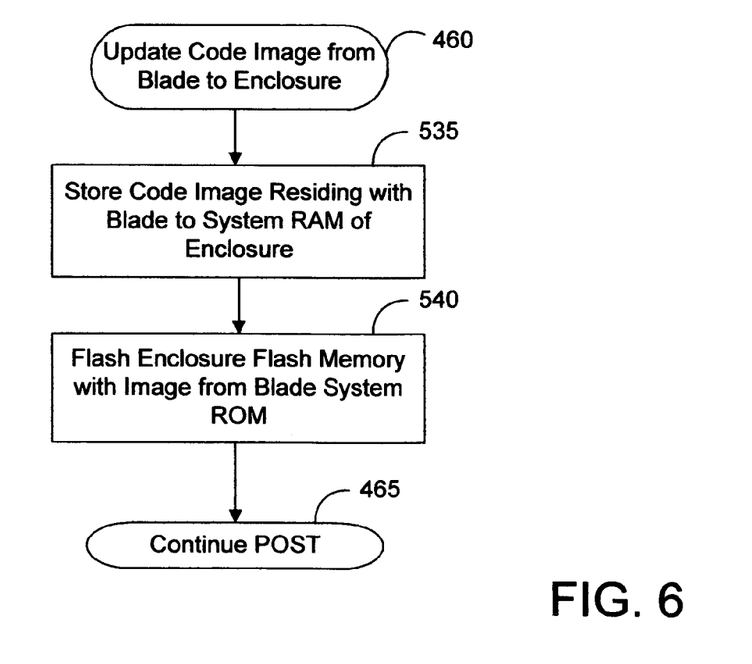
FIG. 6 is a process flow diagram illustrating a sub-process of the flow diagram of FIG. 4 where an enclosure's image of ROM firmware or other software for an initializing blade's type is updated with a version of system ROM firmware or other software which currently resides with the initializing blade in accordance with an embodiment of the invention.

FIG. 6 illustrates a more detailed procedural flow for the Update Code Image from Blade to Enclosure process at 460. In an embodiment, the code image is transferred from the blade system ROM 360 to the enclosure 305 over bus 385 and through controller 350. The code image is stored in the RAM (not shown) of the enclosure at 535. At 540, the enclosure 305 flashes its flash ROM to overwrite its current version/revision of the code image 330 for that blade type with the code image from its RAM (not shown). The blade 340 then continues its POST process back at 465, FIG. 4.

While embodiments do not require the enclosure and blade to have the ability to flash their own ROMs as described above, the ability to perform this operation allows the user to easily propagate a new code revision to all blades of the same type in the system by simply upgrading the enclosure's image of the code image for that blade type. Similar functionality can be obtained by updating the code on one particular blade, allowing that code to be copied to the enclosure (assuming appropriate configuration of the update rules), and then rebooting the other blades in the platform. This would permit the update to propagate the updated revision to all blades in the system.

In an embodiment, the pre-configurable update rules can be configured to provide a number of desirable update policies. With respect to the updating of blades from the enclosure, a first policy can be to always update the blade's system ROM with that code image stored on the enclosure unless the enclosure's code image does not support the hardware configuration of the blade. A second policy can be to only update the blade's system ROM with the enclosure's code image if the enclosure's code image is a newer version/revision than that currently stored on the blade. A third possible policy can be to always update the blade's system ROM to that code image stored on the enclosure for that blade type unless the blade's code image version/status is newer than that on the enclosure and the blade's version/revision contains a critical code fix not included in the enclosure's current version/revision. A fourth policy can be to never update the enclosure's code image to the blade. This essentially disables the invention. In an embodiment, in no case will a blade allow itself to be automatically updated to a code version/revision that does not support the hardware configuration of that blade.

In an embodiment, the pre-configurable update rules can also be configured to provide desirable update policies with respect to the updating of the code images stored on the enclosure from the blades. A first such policy can be to never upgrade the current version/revision of the enclosure's image with the current version/revision of the blade's code image. A second policy can be to upgrade the current version/revision of the enclosure's code image with a blade's current version/revision of the code image if the blade's current version/revision is newer. A third policy could be to only upgrade the enclosure's current version/revision of the code image with a current version/revision of the blade's code image if the blade's current version/revision is newer and the blade's version/revision of the code image includes a critical change not included in the enclosure's current version/revision of the code image for the blade type.

Thus, for a user whose preferred code revision management policy is to always utilize the latest code revisions, the rules would be preconfigured to provide the second policy described above for both enclosure as well as blade upgrades. For a user who prefers to standardize on a particular code revision and does not always wish to utilize the latest code revisions, the user can pre-configure the rules to provide for the first upgrade policy for both the blades as well as the enclosure as described above. A user who prefers to standardize on a particular code version/revision but wishes to obtain critical code updates can configure the policies for updating the blades and enclosure code images to the third policy described above for both. The foregoing combinations of enclosure and blade upgrade policies are the most typical. Those of skill in the art will recognize that certain other combinations of the foregoing enclosure and blade update policies are not logical. A GUI interface can be provided through the user interface to provide user options for selecting only logically appropriate combinations of the above described update policies.

Figure 7:
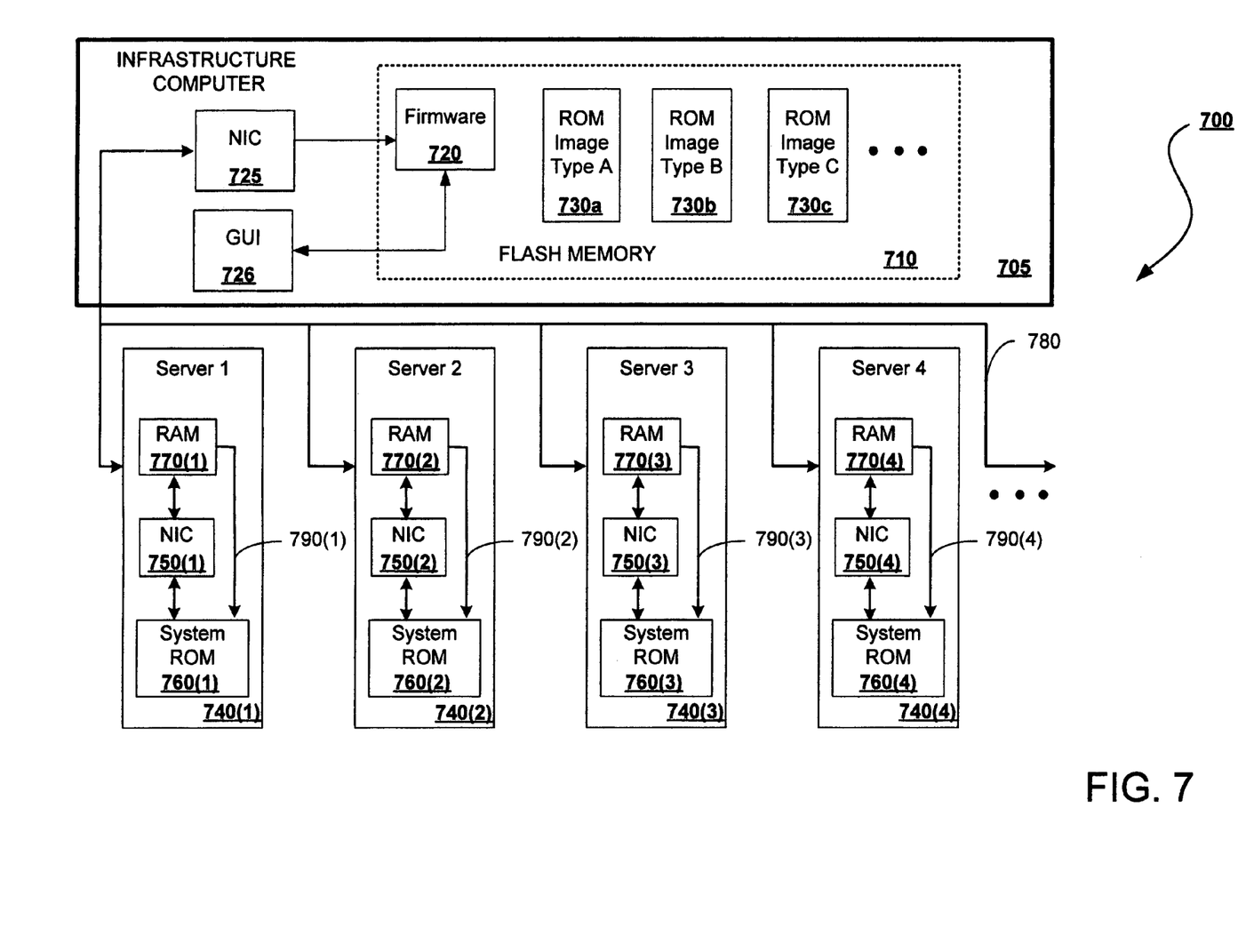
FIG. 7 is a block diagram that illustrates a rack-based system configured to implement a more flexible automated method of managing system ROM firmware revisions or revisions of other system software deployed in the context of blade servers in accordance with an embodiment of the invention.

FIG. 7 illustrates an embodiment of the invention for a rack-based server environment. The system 700 can operate in the same manner as described previously for blade-based systems 300, FIG. 3. The primary difference is that the infrastructure computer 705 does not have an enclosure, as each rack-based server 740(1-4) typically is a stand-alone system. Thus, the firmware 720 and semi-permanent memory 710 upon which it is stored, along with a user interface 726, can be (although not necessarily) located within a single infrastructure computer 705. Code images 730(a-c) are maintained for various server types in the same manner as previously discussed for blade-based systems. Another difference is that the rack-based servers are typically coupled together to the infrastructure through a network 780 such as a LAN or the Internet. The controller function for handshaking between the servers 740(1-4) and the firmware 720 residing in the infrastructure computer 705 can be conducted through network interface cards (NICs) 750(1-4) and 725 or an equivalent thereof. Those of skill in the art will appreciate that notwithstanding the minor architectural differences in the servers and infrastructure, embodiments of the method of the invention including those illustrated in FIGS. 4-6, may be implemented with the system 700 of FIG. 7 to manage revisions of software code such as system software for rack-based systems.

Embodiments of the invention provide for automated version/revision management of software code, including system firmware, running on a plurality of servers operating within a common infrastructure. Embodiments of the invention can exploit components already common to such systems operating in the field to exchange version/revisions status information for images of the software code between an initializing server and the infrastructure. Based on the status information in view of update policies established by users through preconfigured update rules, a determination can be made whether an update from infrastructure to server, server to infrastructure or neither is to be made. If an upgrade is to be made, the code image is transmitted and then written over the previous version/revision. Embodiments can include routines to permit the infrastructure and the server to flash the updates to flash ROM parts to fully automate the process. Currently employed upgrade policies can be automated, and include safeguards to prevent problems such as downgrading code in servers that will not support the servers' hardware configuration or to eliminate critical updates found in the server's version/revision that are not reflected in the infrastructure's. Moreover, mass upgrade operations are simplified, such as propagating versions/revisions from a newly installed server to other servers within the infrastructure. Finally, maximum user flexibility is maintained in that the system permits complete control over if and when such updates are propagated, including the ability to disable the automated process completely if the user desires.

What is claimed is:

1. A method of managing revisions of software code for one or more servers in an infrastructure, said method comprising:
   transmitting to the infrastructure an indication of the version of the code currently residing with one of the servers and to the one of the servers an indication of the version of the code for the server's type currently residing with the infrastructure;
   determining whether the server's version should be updated to the infrastructure's, whether the infrastructure's version should be updated to the server's, or neither based on the transmitted indications in view of a set of preconfigured update rules;
   if the infrastructure's version should be updated to the server's: replacing the image of the code currently residing with the infrastructure with an image of the code currently residing with the server; and
   if the server's version should be updated to the infrastructure's: replacing the image of the code currently residing with the server with an image of the code currently residing with the infrastructure for the server's type;
   wherein said replacing comprises:
      if the infrastructure's version should be updated to the server's:
         transmitting an image of the code currently residing with the server to the infrastructure;
         storing the transmitted image of the code to memory of the infrastructure; and
         completing the server's initialization process;
      if the server's version should be updated to the infrastructure's:
         transmitting an image of the code currently residing with the enclosure to the server; and
         storing the transmitted image of the code to memory of the server;
         re-launching the server's initialization process; and
         flashing a ROM with the version stored in the RAM.

2. The method of claim 1 further comprising launching an initialization process for the one of the servers and wherein said transmitting further comprises:
   assessing whether a transfer is possible based on one or both of the transmitted version indications in view of the preconfigured update rules; and
   if not possible, completing the server's initialization process without an update.

3. The method of claim 1 wherein said determining further comprises assessing whether the infrastructure's version supports the server's hardware.

4. The method of claim 3 wherein said determining further comprises assessing whether the server's version comprises critical changes.

5. The method of claim 4 wherein the preconfigured rules comprise updating always the server with the infrastructure's version unless the infrastructure's version does not support the server's hardware.

6. The method of claim 5 wherein the preconfigured rules comprise updating the server to the infrastructure's version always unless the server's version is a newer revision than the infrastructure's version and the server's version contains a critical change not included in the infrastructure's version.

7. The method of claim 1 wherein the preconfigured rules comprise updating the server with the infrastructure's version if the infrastructure's version is newer than the server's version.

8. The method of claim 1 wherein the preconfigured rules comprise never updating the server with the infrastructure's version.

9. The method of claim 3 wherein the preconfigured rules comprise updating the infrastructure with the server's version only if the server's version is a newer revision than the infrastructure's version and the server's version includes a critical change not included in the infrastructure's version.

10. The method of claim 1 wherein the preconfigured rules comprise never updating the infrastructure with the server's version.

11. The method of claim 1 wherein the preconfigured rules comprise updating the infrastructure with the server's version if the server's version is newer than the infrastructure's version.

12. The method of claim 1 wherein said storing comprises:
    writing the transmitted image initially to RAM memory; and
    flashing ROM memory with the written image.

13. The method of claim 1 wherein the software code is system firmware for the server.

14. The method of claim 1 wherein the servers comprise blades and the infrastructure comprises an enclosure for housing the blades.

15. A method of managing revisions of system firmware code for blades in an infrastructure, the infrastructure comprising an enclosure for housing the blades, said method comprising:
    launching the initialization process of a blade installed in the enclosure;
    transmitting from the blade to the enclosure an indication of the version of the firmware code currently residing with the blade;
    determining whether a version of the firmware code might be transferred between the blade and the enclosure and if not, completing the blade's initialization process without an update;
    otherwise, transmitting to the blade an indication of the version of the firmware code associated with the blade's type currently residing with the enclosure;
    determining whether the code should be updated from either the blade to the enclosure or from the enclosure to the blade and if neither, continuing with the initialization to completion;
    if the revision of the firmware code should be updated from the blade to the enclosure, replacing the image of the version of the code currently residing with the enclosure with an image of the version of the code currently residing with the blade; and
    if the revision of the code should be updated from the enclosure to the blade, replacing the version of the code currently residing with the blade with the image of the version of the code currently residing with the enclosure.

16. The method of claim 15 wherein said determining whether a version of the firmware code might be transferred and said determining whether the firmware code should be updated further comprises assessing the transmitted indications of version in view of preconfigured update rules.

17. The method of claim 16 further comprising pre-configuring the update rules through a user interface coupled to the enclosure.

* * * * *